United States Patent
Hu

(10) Patent No.: US 6,877,891 B2
(45) Date of Patent: Apr. 12, 2005

(54) CONTAINER OF LIQUID SEASONING WITH A STIRRING MECHANISM

(75) Inventor: Mei-Hui Hu, Tainan (TW)

(73) Assignee: Her Chian Acrylic Co., Ltd., Tainan (TW)

( * ) Notice: Subject to any disclaimer, the term of this patent is extended or adjusted under 35 U.S.C. 154(b) by 165 days.

(21) Appl. No.: 10/439,223

(22) Filed: May 16, 2003

(65) Prior Publication Data

US 2003/0218935 A1 Nov. 27, 2003

(30) Foreign Application Priority Data

May 24, 2002 (TW) ........................ 91207602 U

(51) Int. Cl.⁷ ................................................. B01F 7/18
(52) U.S. Cl. ..................................................... 366/247
(58) Field of Search ................................. 366/242, 244, 366/245, 246, 247, 248, 249, 250, 251, 252, 347

(56) References Cited

U.S. PATENT DOCUMENTS

| | | | | |
|---|---|---|---|---|
| 670,834 A | * | 3/1901 | Benedict | 366/97 |
| 857,683 A | * | 6/1907 | Stern | 366/247 |
| 964,306 A | * | 7/1910 | Otten | 366/245 |
| 1,002,931 A | * | 9/1911 | Reaume | 366/245 |
| 1,177,977 A | * | 4/1916 | Warner | 366/252 |
| 1,235,378 A | * | 7/1917 | Poltschbach | 366/245 |
| 2,148,399 A | * | 2/1939 | Crissey | 366/244 |
| 2,459,498 A | * | 1/1949 | Cameron | 366/256 |
| 4,010,934 A | * | 3/1977 | McCord et al. | 366/247 |
| 4,065,811 A | * | 12/1977 | Pauty | 366/244 |
| 4,359,283 A | * | 11/1982 | McClellan | 366/247 |
| 4,460,279 A | * | 7/1984 | Krasney | 366/247 |
| 4,488,817 A | * | 12/1984 | Uesaka et al. | 366/247 |
| 4,854,718 A | * | 8/1989 | Wang | 366/252 |
| 4,893,940 A | * | 1/1990 | Waisberg | 366/247 |
| 4,946,286 A | * | 8/1990 | Purkapile | 366/247 |
| 5,199,788 A | * | 4/1993 | Stallings | 366/247 |
| 5,407,270 A | * | 4/1995 | Barile et al. | 366/247 |
| 6,109,780 A | * | 8/2000 | Lesniak | 366/247 |
| D441,247 S | * | 5/2001 | Beam | D7/305 |
| 6,224,253 B1 | * | 5/2001 | Dixon | 366/247 |
| 6,419,385 B1 | * | 7/2002 | Walls | 366/247 |

* cited by examiner

Primary Examiner—Tony G. Soohoo
(74) Attorney, Agent, or Firm—Rosenberg, Klein & Lee

(57) ABSTRACT

A container of liquid seasoning includes a containing body, a cover, and a stirring member for mixing different kinds of liquid seasonings with; the cover is tightly fitted in the containing body for sealing the containing body; a circular rotary disk is turnably arranged on an upper side of the cover; the rotary disk has a handle, and a shaft, which projects down through the cover, and which has a lengthways extending connecting hole formed with an engaging section; the stirring member is rotary in the containing body with a lower end of a shaft thereof being passed into a locating hole on the bottom of the containing body and with an engaging section of an upper end of the shaft being inserted into, and engaging, the connecting hole so that the stirring member can be turned together with the rotary disk to blend liquid seasonings.

5 Claims, 8 Drawing Sheets

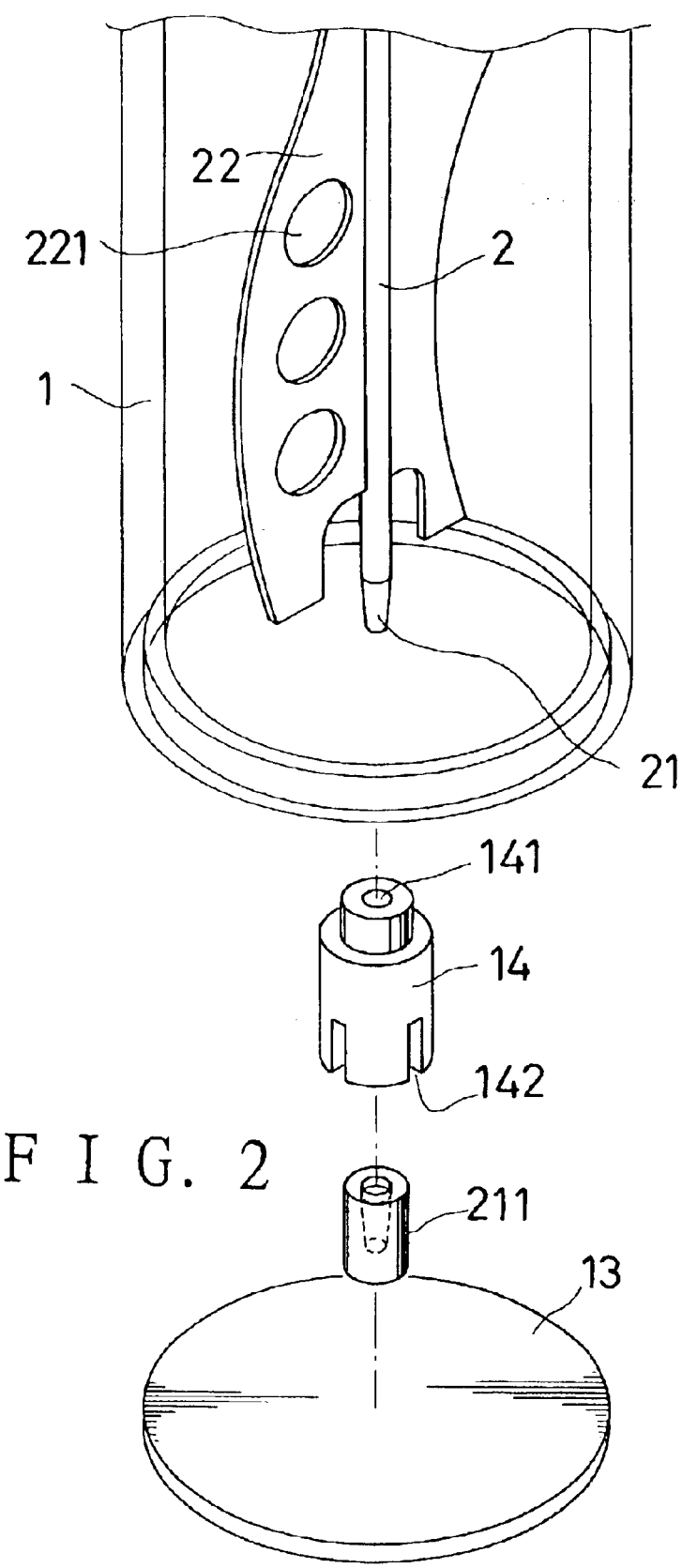
F I G. 2

CONTAINER OF LIQUID SEASONING WITH A STIRRING MECHANISM

BACKGROUND OF THE INVENTION

1. Field of the Invention

The present invention relates to a container of liquid seasonings with a stirring mechanism, more particularly one, which is relatively simple in structure, and convenient to use, and can form a sealed room when not used for preventing the contents from decaying too soon owing to contact with the atmosphere.

2. Brief Description of the Prior Art

Different kinds of liquid seasonings sometimes have to be blended in cooking or dining to have a particular flavor for making the foods more delicious.

Referring to FIGS. 7, and 8, a conventional liquid seasoning container with a stirring mechanism for the contents includes a containing body 51, an upper connecting member 52, a supporting member 53, inner and outer transmission gears 54, and 55, an upper rotary disk 56, a detaining ring 57, and a stirring unit 58. The containing body 51 has an outlet 511 adjacent to an upper opening thereof for allowing liquid seasoning to be poured out from. The upper connecting member 52 is securely joined to the upper end of the containing body 51 to cover the opening. The supporting member 53 is fitted to the connecting member 52, and has an inner sleeve 531 substantially formed in the middle thereof, an outer sleeve 532 formed next to the inner sleeve 531, and an inner circular supporting portion (not numbered) around the sleeves 531, 532. The inner and outer transmission gears 54, and 55 respectively have shafts 541, and 551 formed thereon. The shafts 541, and 551 are turnably passed through the inner, and the outer sleeves 531, and 532 of the supporting member 53 respectively so that the transmission gears 54, and 55 engage each other. The shaft 541 further projects through the connecting member 52 into the containing body 51.

The upper rotary disk 56 has an annular step-shaped portion (not numbered) on an outer side thereof, teeth 561 spaced out on a circular inner side thereof, and a handle 562 projecting from the upper side and near to the edge thereof. The upper rotary disk 56 is turnably positioned in the supporting member 53 and on the inner circular supporting portion of the supporting member 53 with the teeth 561 engaging the outer transmission gear 55. The detaining ring 57 is positioned above the annular step-shaped portion of the upper rotary disk 56, and securely joined to the supporting member 53 so that the upper rotary disk 56 is stopped from falling out of the supporting member 53. The stirring unit 58 is arranged under the connecting member 52, and joined to the shaft 541 of the inner transmission gear 54.

The rotary disk 56 is turned by means of operating the handle 562 so that the stirring unit 58 is turned. Thus, the present container can be used to blend liquid seasonings contained in the containing body 51 thereof. However, the container is found to have disadvantages as followings:

1. The container is comprised of relatively many parts, including the inner and outer transmission gears for passing movement of the rotary disk 56 on to the stirring unit 58, and is complicated in structure. Consequently, the container is prone to wear or become faulty through use over time, especially at the transmission gears.
2. The stirring unit 58 has to be removed together with the supporting member 53 from the containing body 51 for allowing liquid seasonings to be added into the containing body 51. Consequently, content of the container that has already stuck to the stirring unit are prone to drop onto the table or ground, causing troubles to the users.
3. The outlet 511 is provided for allowing liquid season to be poured out from the containing body 51, and is not provided with a seal so that the users can pour out liquid seasoning directly without first having to open a seal. Consequently, the seasoning contents of the container is prone to decay very soon owing to constant contact with dust and other substances in the atmosphere.

SUMMARY OF THE INVENTION

It is a main object of the present invention to provide a container of liquid seasoning with a stirring mechanism, which is simple in structure, not prone to become faulty, and inexpensive.

It is another object of the present invention to provide a container of liquid seasoning with a stirring mechanism, in which a sealed room can be formed for preventing the seasoning contents from decaying too soon owing to contact with the atmosphere when not used.

The container includes a containing body, a cover, and a stirring member; the containing body has an annular connecting groove on an inner side; the cover is tightly fitted in the containing body with a sealing ring thereof being closely fitted in the annular connecting groove. A circular disk is rotary on an upper side of the cover; the rotary disk has a handle arranged near to an edge thereof, and a shaft, which has a lengthways extending connecting hole formed with an engaging section; the stirring member has a shaft, and several plates projecting sideways from the shaft; a lower end of the shaft of the stirring member is passed through a locating hole on the bottom of the containing body, and an engaging section of an upper end of the shaft is inserted into, and engages, the connecting hole of the shaft of the rotary disk so that the stirring member can be turned together with the rotary disk.

BRIEF DESCRIPTION OF THE DRAWINGS

The present invention will be better understood by referring to the accompanying drawings, wherein:

FIG. 2 is a partial exploded perspective view of the container of liquid seasoning according to the present invention.

DETAILED DESCRIPTION OF THE PREFERRED EMBODIMENTS

Figure 1:
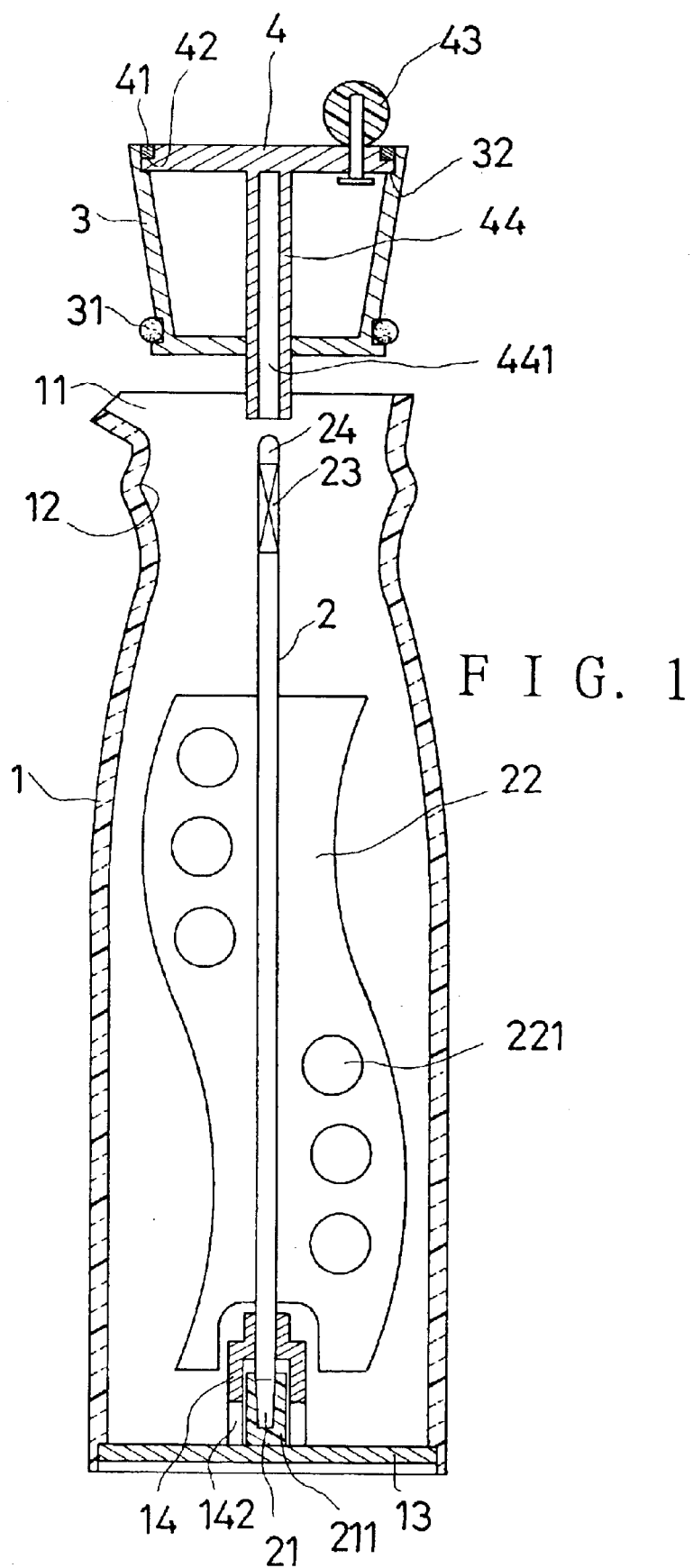
FIG. 1 is a vertical cross-sectional view of the container of liquid seasoning of the present invention, with the cover being opened.

Referring to FIGS. 1, and 2, a preferred embodiment of a container of liquid seasoning in the present invention includes a containing body 1, a stirring member 2, a cover 3, and a rotary disk 4.

The containing body 1 is formed with an annular connecting groove 12 on an inner side of an upper end portion, and an outlet 11 adjacent to an upper opening thereof for allowing liquid seasoning to be poured out from. The containing body 1 has a bottom 13, and a locating member 14 joined to a middle of an upper side of the bottom 13. The locating member 14 has a middle room, a vertical through hole 141 extending from a top and communicating with the middle room, and several gaps 142 in communication with the middle room on an annular wall thereof.

The stirring member 2 has a shaft (not numbered), which has a lower insertion end 21, and several plates 22 projecting sideways from the shaft. The shaft of the stirring member 2 is further formed with an engaging portion 23 under a cylindrical upper end portion 24 thereof; the cylindrical upper end portion 24 is rounded at the top. Each plate 22 is formed with several through holes 221. The lower insertion end 21 of the shaft of the stirring member 2 is passed through the through hole 141 of the locating member 14 for the stirring member 2 to be rotary on the locating member 14. A rotary block 211 bigger than the vertical through hole 141 is disposed in the middle room of the locating member 14 while the lower insertion end 21 of the shaft is fixed to the rotary block 211; thus, the stirring member 2 is more stable when being operated, and can't separate from the containing body 1.

The cover 3 has a sealing ring 31 tightly passed around an outer side of a lower end thereof, and is formed with an circular step-shaped portion 32 on an inner side of an upper end thereof.

The rotary disk 4 is circular to be capable of fitting with the circular step-shaped portion 32 of the cover 3. The rotary disk 4 has a circular step-shaped portion 42 formed around an edge thereof, a handle 43 turnably projecting from the upper side and near to the edge thereof, and a shaft 44 projecting downwards from a middle of a lower side thereof. The shaft 44 has a connecting hole 441 lengthways formed therein, which connecting hole 441 has a cylindrical lower end, and an engaging section (not numbered) for engaging the engaging portion 23 of the shaft of the stirring member 2. The rotary disk 4 is turnably arranged over the circular step-shaped portion 32 of the cover 3, and the shaft 44 is passed through a lower portion of the cover 3, and a detaining ring 41 is positioned above the circular step-shaped portion 42 of the rotary disk 4, and securely joined to the cover 3 so that the rotary disk 4 is stopped from falling out of the cover 3. In addition, both the engaging section of the connecting hole 441 and the engaging portion 23 of the shaft of the stirring member 2 can be formed such as to have the same polygonal cross-section to fit with each other.

Figure 3:
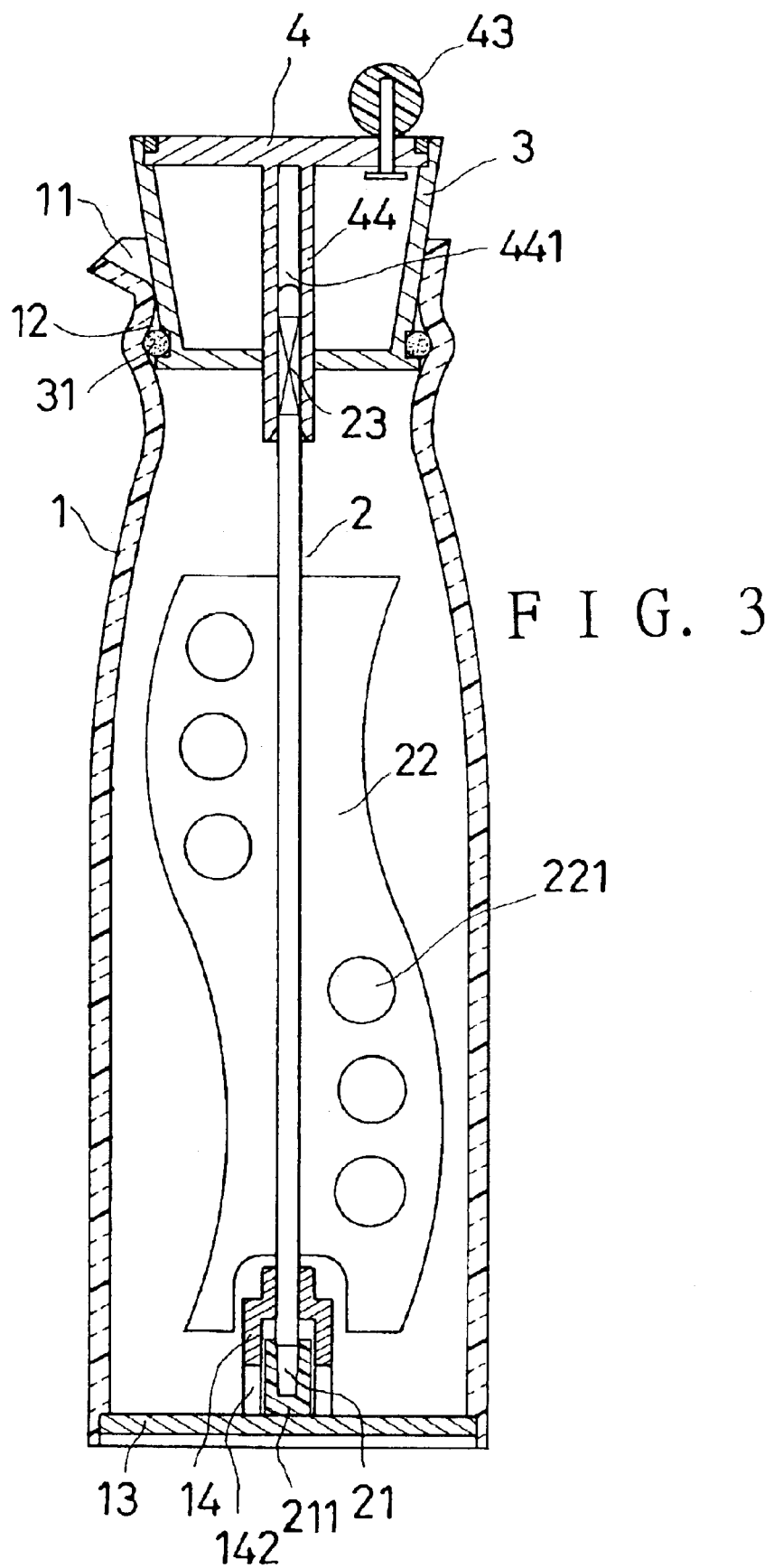
FIG. 3 is a vertical cross-sectional view of the container of liquid seasoning according to the present invention.

After the rotary disk 4 is joined to the cover 3, the cover 3 is fitted to the containing body 1 with the sealing ring 31 being closely fitted in the annular groove 12, and with the engaging section of the connecting hole 441 being mounted around, and engaging, the engaging portion 23 of the shaft of the stirring member 2, as shown in FIG. 3; thus, the stirring member 2 can be turned together with the rotary disk 4; both the rounded top of the cylindrical upper end portion 24 of the shaft and the cylindrical lower end of the connecting hole 441 help the connecting hole 441 to be mounted around the shaft of the stirring member 2. Thus, the stirring member 2 can be turned by means of operating the handle 43 so that different kinds of liquid seasonings contained in the containing body 51 are blended by means of the plates 22. The gaps 142 allow those liquid seasoning that have flowed through a small aperture between both the shaft and the locating member 14 to flow out of the locating member 14.

The cover 3 has to be first removed from the containing body 1 for allowing liquid seasoning to be added into the containing body 1 or for allowing liquid seasoning to be poured out from the outlet 11 after blended.

Figure 4:
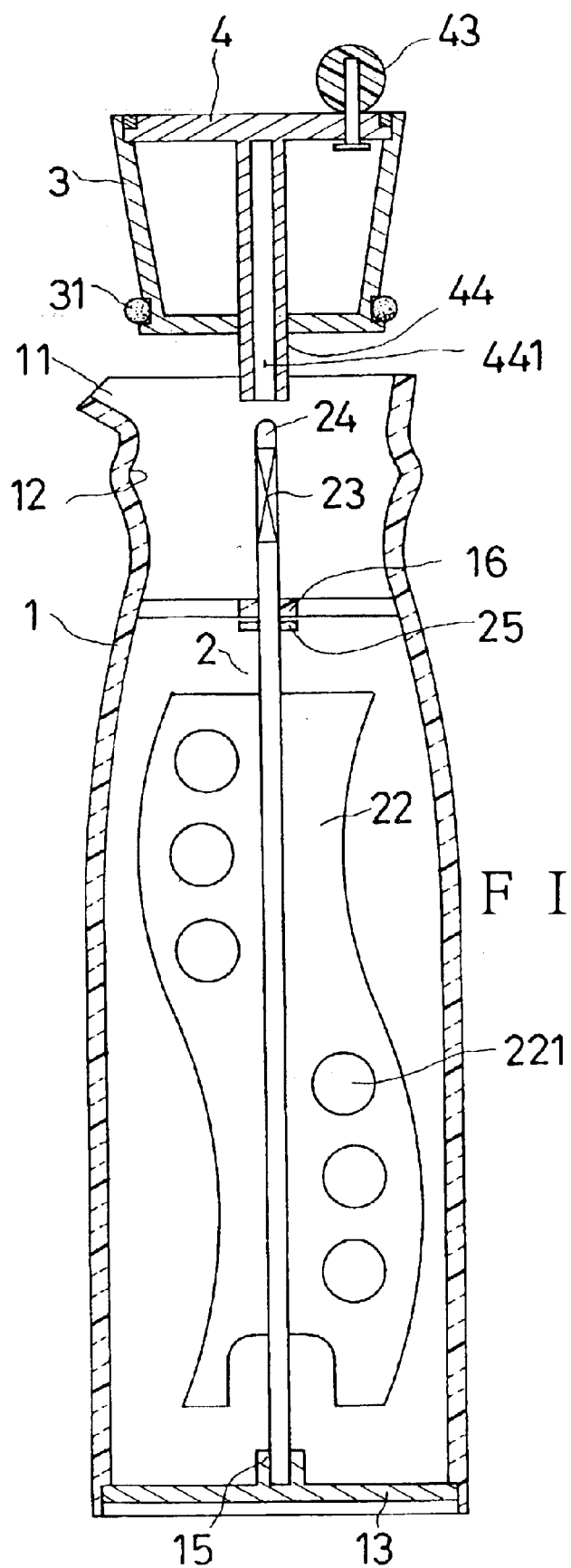
FIG. 4 is a vertical cross-sectional view of the container of liquid seasoning in the second embodiment, with the cover being opened.
Figure 5:
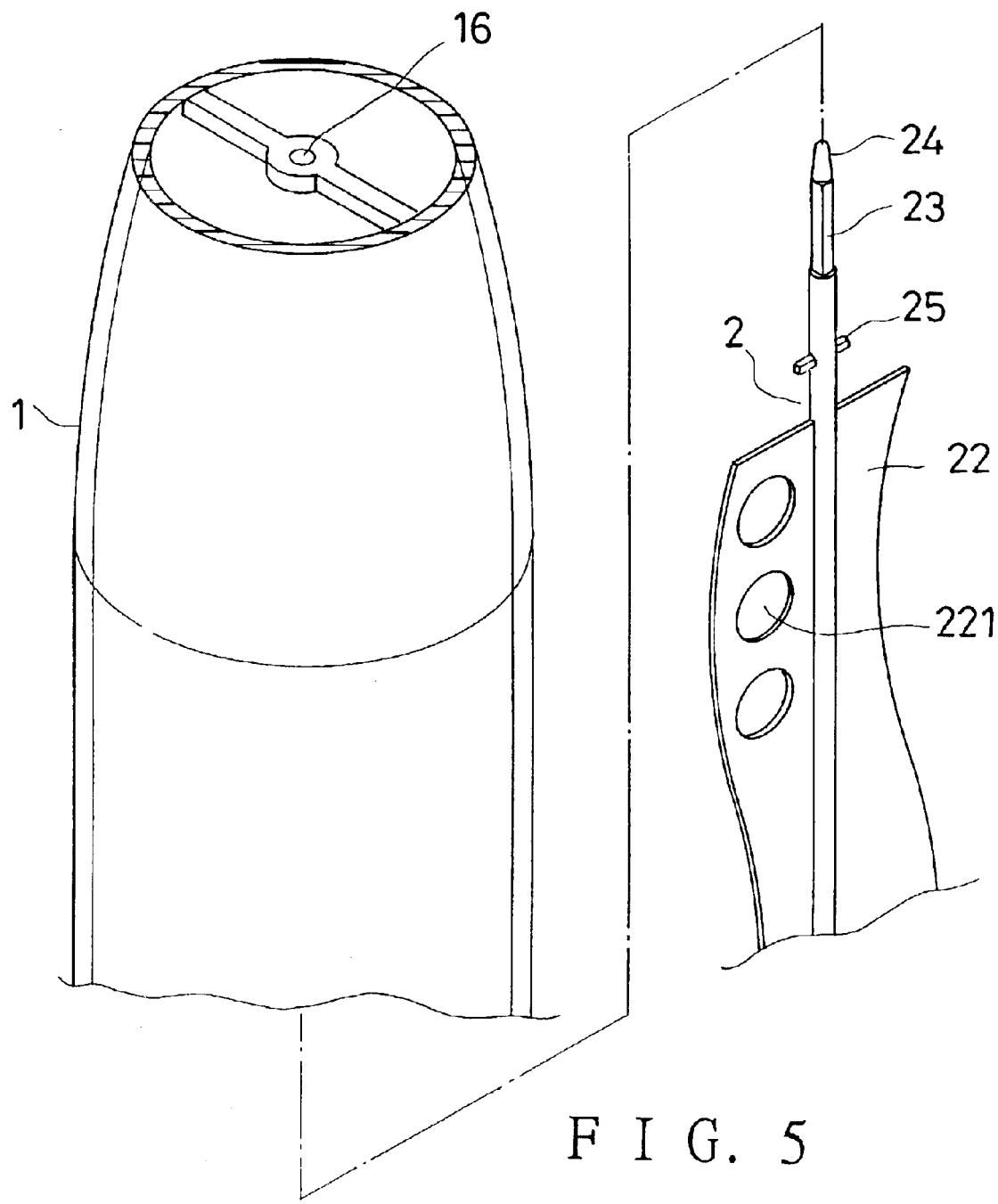
FIG. 5 is a partial exploded perspective view of the container of liquid seasoning in the second embodiment.
Figure 6:
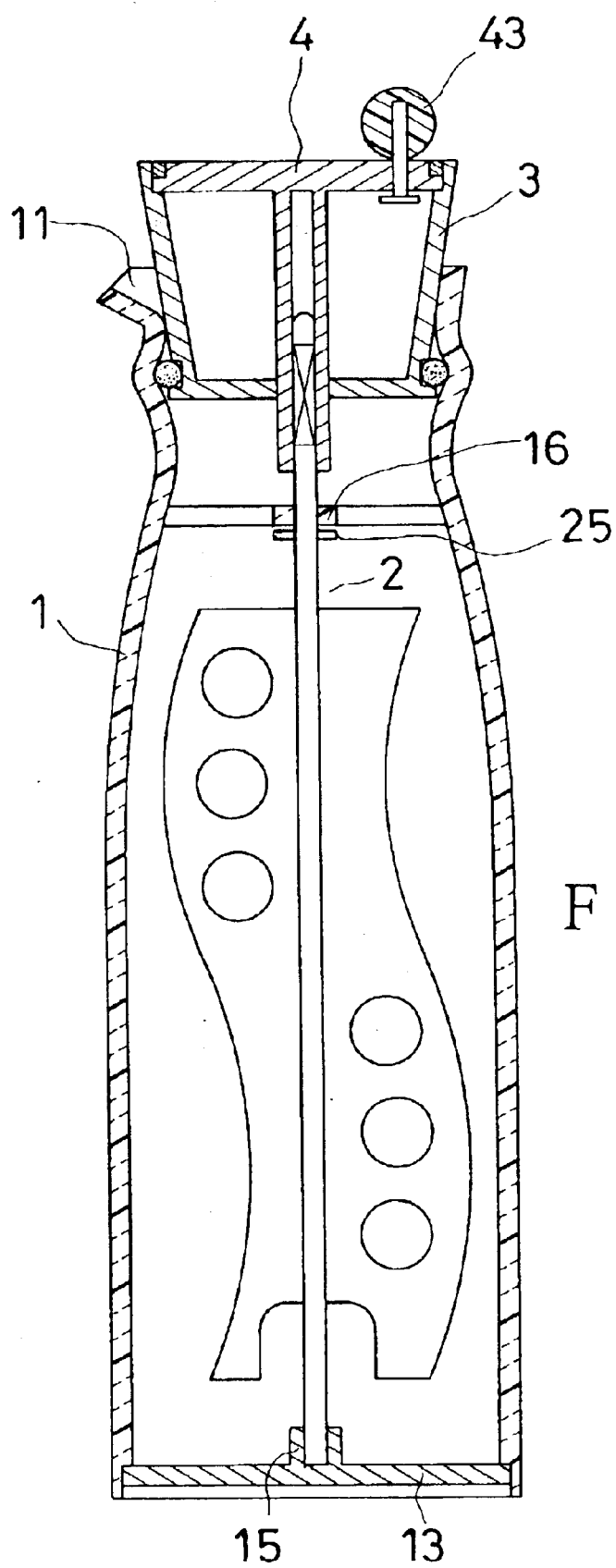
FIG. 6 is a vertical cross-sectional view of the container of liquid seasoning in the second embodiment.
Figure 7:
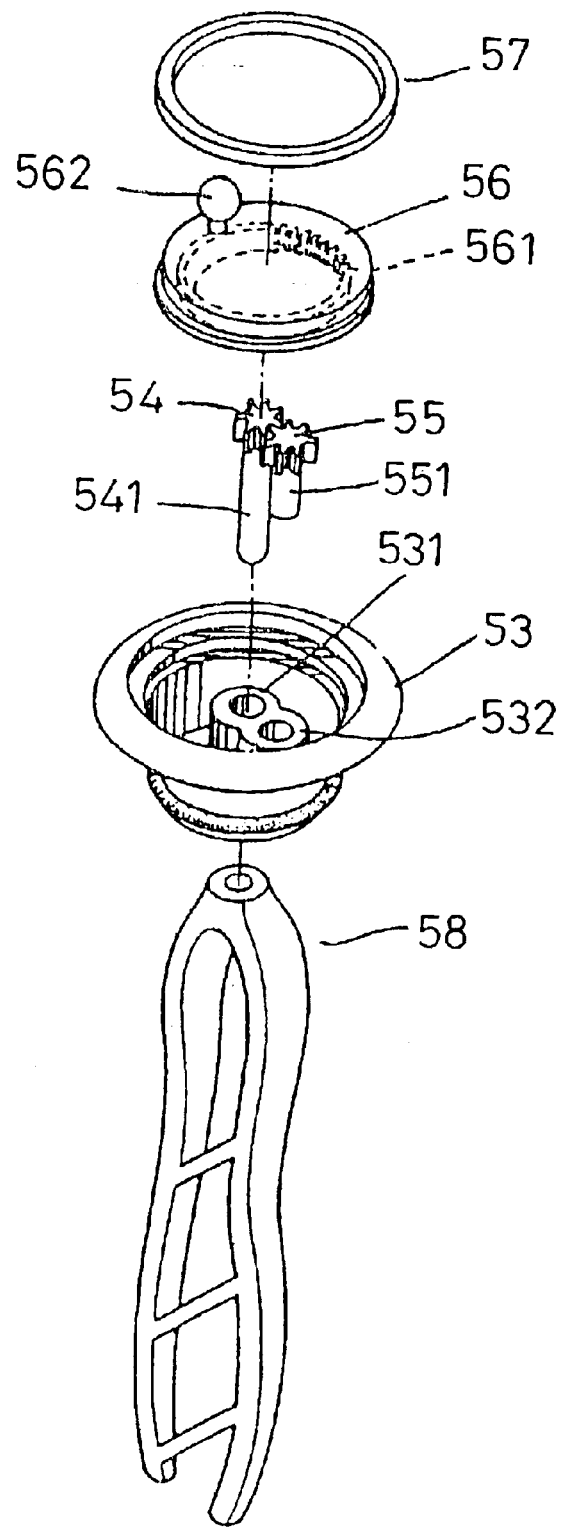
FIG. 7 is an exploded perspective view of the prior container of liquid seasoning as described in the Background.
Figure 8:
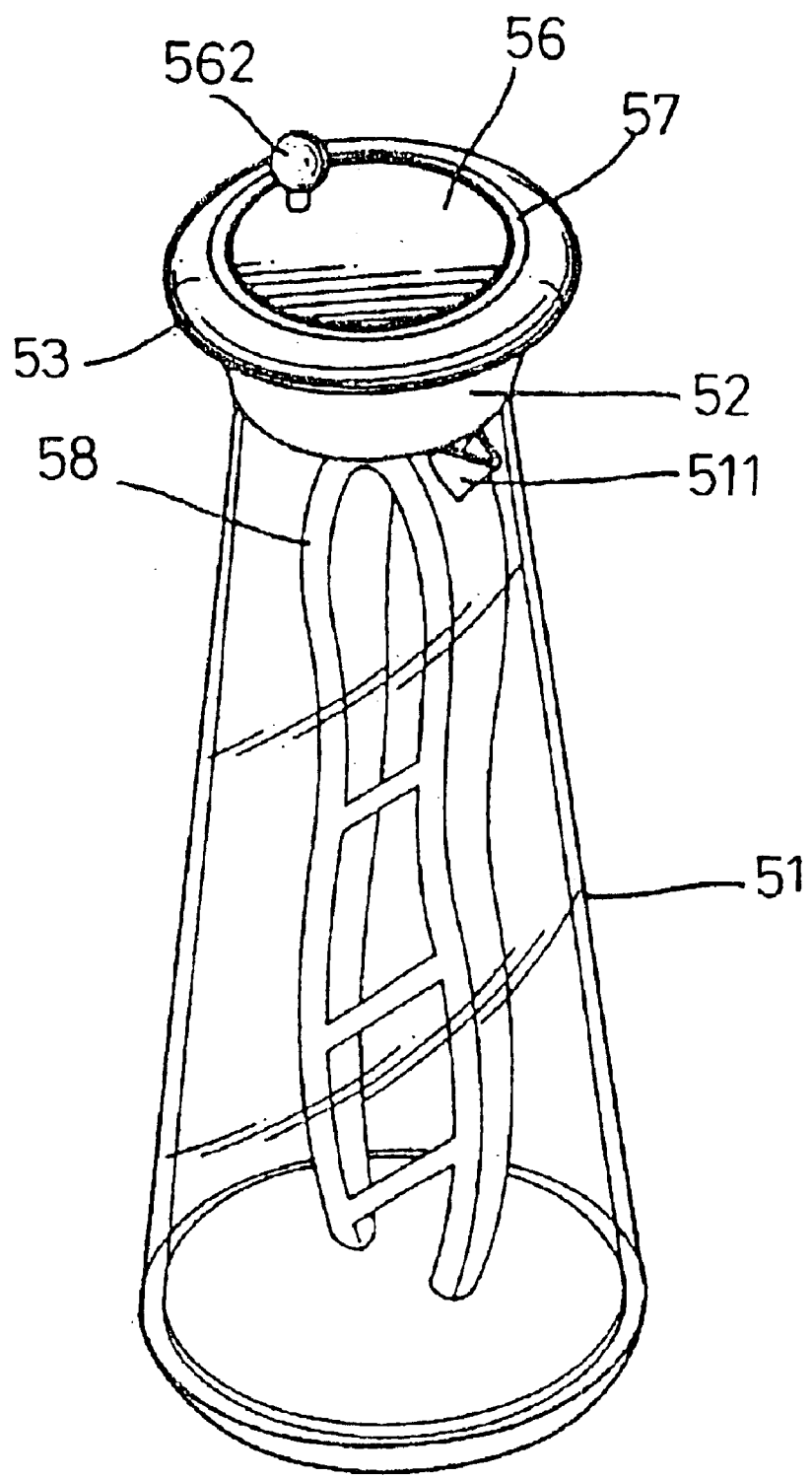
FIG. 8 is a perspective view of the prior container of liquid seasoning.

Referring to FIGS. 4, and 5, according to a second embodiment of the present invention, in which some modifications are made to the first embodiment, the containing body 1 further has a transverse locating support 16 formed below annular connecting groove 12 thereof, and is formed with an annular locating projection on the bottom 13 instead of the locating member 14 of the first embodiment, which defines a locating room 15. The shaft of the stirring member 2 is passed into the locating room 15 at the lower end, and passed through a middle hole of the locating support 16 at the upper end. The shaft of the stirring member 2 is further formed with stopped protrusions 25, which are arranged under the locating support 16, and which extend sideways beyond the middle hole of the locating support 16 so that the stirring member 2 can't separate from the containing body 1. Thus, the container can be used in the same way as that of the first embodiment.

From the above description, it can be easily understood that the container of liquid seasoning in the present invention has advantages as followings:

1. The stirring member 2 is made to turn directly by means of turning the rotary disk 4 therefore the container is relatively simple in structure, inexpensive, and less likely to become faulty through use over time, and in turns, the container is more competitive.
2. The stirring member 2 won't be lifted from the containing body 1 when the cover 3 is separated from the containing body 1 for allowing liquid seasoning to be added into the containing body 1, preventing liquid seasoning on the stirring member 2 from dropping onto the table or ground.
3. The sealing ring 31 is fitted in the annular groove 12 under the outlet 11 when the cover 3 is fitted to the containing body 1 therefore the outlet 11 is sealed when the cover 3 is closed, and the seasoning contents of the container is isolated from the atmosphere, and can be preserved for longer period of time.

What is claimed is:

1. A container of liquid seasoning, comprising
   a containing body for containing various kinds of liquid seasonings therein; the containing body having an outlet for contents thereof; the containing body having an annular connecting groove on an inner side below the outlet; the containing body having a locating member joined to a bottom thereof; the locating member being formed with a middle room, and a vertical through hole extending from a top thereof;
   a cover having a sealing ring passed around it; the cover being fitted in an upper opening of the containing body with the sealing ring being closely fitted in the annular connecting groove of the containing body;
   a circular rotary disk turnably arranged on an upper side of the cover; the rotary disk having a handle turnably projecting from an upper side near to an edge thereof; the rotary disk having a shaft projecting downwards from a middle thereof; the shaft having a connecting hole formed along it; the connecting hole having an engaging section; a detaining ring being arranged over the edge of the rotary disk and fixed to the cover for preventing the rotary disk from falling off; and a stirring member having a shaft, and several plates projecting sideways from the shaft thereof; the stirring member being rotary in the containing body with the shaft being passed through the vertical through hole of the locating member at a lower end as well as engaging the engaging section of the connecting hole at an engaging section of an upper end portion thereof so that the stirring member can be turned together with the rotary disk by means of operating the handle; the lower end of the shaft of the stirring member being fixed to a rotary block, which is turnably arranged in the middle room of the locating member, and which is bigger than the vertical through hole of the locating member.

2. The container of liquid seasoning as claimed in claim 1, wherein the bottom of the containing body is formed with a locating room at a middle instead of the locating member, and the containing body is formed with a transverse locating support in an upper portion, which has a middle hole, and the shaft of the stirring member is formed with protrusions below the engaging section thereof; the stirring member being rotary in the containing body with the shaft thereof being passed into the locating room on the bottom of the containing body at a lower end as well as with the engaging section of the shaft thereof engaging the engaging section of the connecting hole; the protrusions being arranged below the locating support for preventing the stirring member from separating from the containing body.

3. The container of liquid seasoning as claimed in claim 1, wherein the locating member is formed with a plurality of gaps in communication with the middle room thereof on an annular wall.

4. The container of liquid seasoning as claimed in claim 1, wherein each of the plates of the stirring member is formed with a plurality of through holes.

5. The container of liquid seasoning as claimed in claim 1, wherein the connecting hole of the shaft of the rotary disk is formed with a cylindrical lower end, and a top of the shaft of the stirring member is rounded for helping the shaft of the stirring member to be passed into the connecting hole.

* * * * *